United States Patent [19]

Moores, Jr. et al.

[11] 3,936,100
[45] Feb. 3, 1976

[54] BEARING MOUNTING SYSTEM

[75] Inventors: Robert Gordon Moores, Jr., Cockeysville; Richard Eugene Walton, II, Baltimore, both of Md.

[73] Assignee: The Black and Decker Manufacturing Company, Towson, Md.

[22] Filed: July 2, 1974

[21] Appl. No.: 485,110

[52] U.S. Cl. .................................. 308/15; 308/26
[51] Int. Cl.² ........................................ F16C 13/00
[58] Field of Search ......... 308/15, 22, 26, 27; 51/71

[56] References Cited
UNITED STATES PATENTS 3,223,464  12/1965  Hoddy et al. .................. 308/26 X

*Primary Examiner*—Robert R. Song
*Assistant Examiner*—Gene A. Church
*Attorney, Agent, or Firm*—William Kovensky; Edward D. Murphy; Joseph R. Slotnik

[57] ABSTRACT

A system for mounting two bearings on a single shaft to achieve self-alignment without spherical bearings. The invention system comprises a cast-in convex curved seat which cooperates with resilient hold down means, whereby the bearings are protected from damage by the force of assembly while the system is substantially self aligning.

23 Claims, 5 Drawing Figures

BEARING MOUNTING SYSTEM

This invention pertains to an improved method of mounting bearings. More in particular, the invention pertains to such a system for use where two bearings on a single shaft are to be mounted on or in a housing or the like having cast or otherwise integrally formed bosses on which the bearings are to be located.

Prior to the invention, the mounting of a system wherein two bearings are on one shaft in such an environment was a complicated and costly process. The bosses were frequently machined in order to accurately locate the two bearing seats in proper alignment. The hold down means often comprised other castings which were machined in a complementary manner so as to enclose the bearing to hold it in place in the housing. Such prior systems often included an insert positioned around the bearing and in suitably formed grooves in the boss and in the hold down member, or else included an integral outer race of the bearing to perform the function. This insert or race had a spherical outer surface, and the complementary parts had mating spherical complementary surfaces so that some spherical adjustment was possible to facilitate the aligning of the bearings and the shaft in the housing. In order to allow the shaft to move about its axis to achieve such alignment, the spherical surfaces were male or convex on the outside of the bearing insert and were mating concave or female on the boss and the hold down member.

These systems are well-developed and quite satisfactory when considered solely from a performance standpoint. Their primary disadvantage is the relatively high cost engendered by the extensive machining and number of parts required, as well as the assembly time sometimes required to get the shaft with its two bearings properly aligned.

The present invention provides a simple system which permits the mounting of a shaft with two bearings on bosses in an extremely simple straightforward manner. The invention achieves the advantages of enormous cost savings compared to the prior art. The invention permits the use of unmachined surfaces on the bosses to locate the bearings. The cast or otherwise formed bearing seat, in accordance with the invention, preferably comprises a curved cross-sectional shape. However, a shape could be used so as to make an essentially line contact against the bearing. That is, where the load is exceptionally light, even a sharp edge, or a narrow plateau, could be used. The flat cylindrical outside surface of the bearing, in cooperation with this "line," or toroidal, or other surface, produces the full effect of the prior spherical alignment means. That is, by casting the line contact surface into the support, the effect of the prior separate insert is achieved at enormous cost reduction, at least for relatively small misalignments. Conceptually, the invention turns the prior system "upside-down," that is, the convex or other line contact support surface is now provided on bosses and cast therein rather than being on a separate insert or bearing race. Theoretically, a line contact is formed between the preferred toroidal shaped seat and the bearing outer race.

The invention system further comprises a hold down strap formed of steel or other yielding material. In the present commercial embodiment of the invention, heat treated spring steel is used because it is elastic enough to conform to the bearing, and has a high yield strength to give good holding qualities. The strap is prefabricated so that it will stretch or yield slightly during assembly, but will always provide sufficient elastic force to snugly secure the bearing onto the seat while at the same time aligning the bearings. Depending on other conditions, the strap could be stretched to more or less than its elastic limit. Thus, some of the work and force used in assembly is absorbed by the straps rather than by the bearings, and the bearings and the shaft are saved from distortion. The hold down force is distributed evenly over the bearings. Since the straps yield in assembly, the tolerances on their manufacture are greatly relaxed, thus enhancing the cost reduction effect of the invention.

In regard to the hold down means, the invention includes any other resilient means which will absorb and distribute the energy imparted by assembly. For example, a more conventional cast hold down member, modified by the inclusion of one or more resilient inserts to absorb the assembly force could just as well be used within the teaching of the invention in cooperation with the formed bearing seat. This particular modification also lends itself to use with a "clam shell" type of housing, i.e., one in which the two halves of the housing come together and thereby form both parts of the bearing seats. In such case, it is conceivable for the bearing seat to be formed in one half, and the resilient means to hold the bearings therein to be provided in the other half, thereby further achieving cost savings by eliminating the strap or other hold down means and the corresponding assembly operations.

The above and other advantages of the invention will be pointed out or will become evident in the following detailed description and claims, and in the accompanying drawing also forming a part of the disclosure in which:

Figure 1:
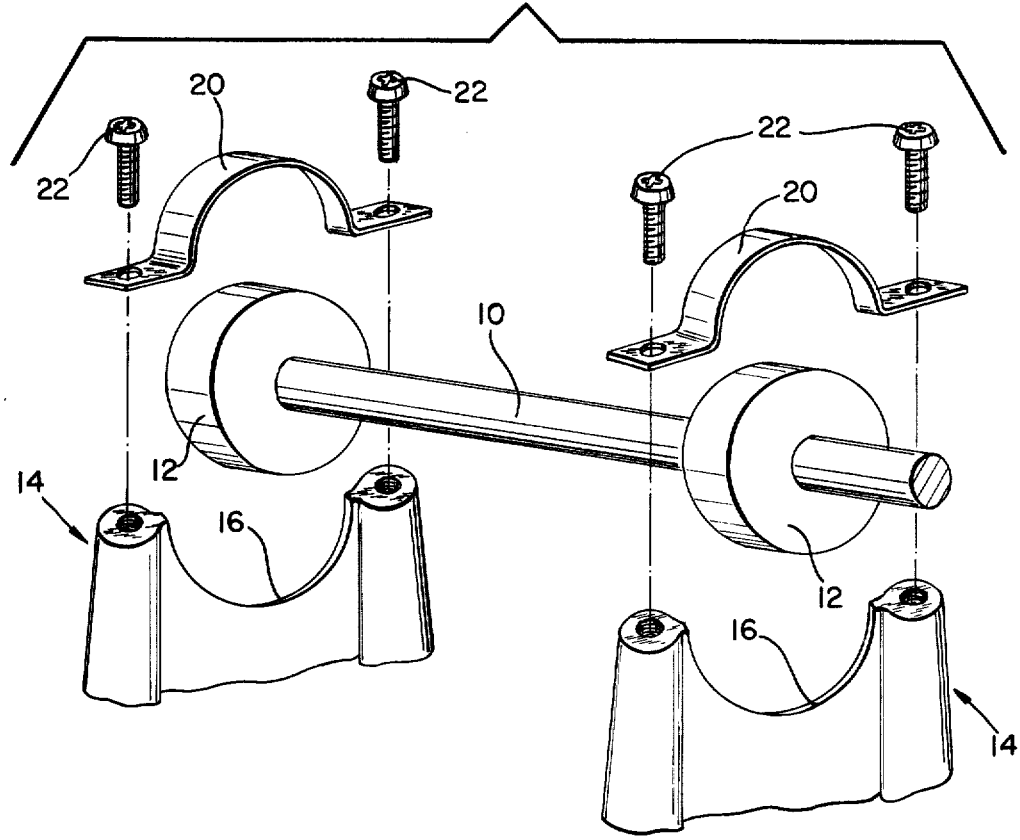
FIG. 1 is a prospective and exploded view of a bearing mounting system in accordance with the invention.

Referring now to FIG. 1, there is shown a shaft 10 carrying a pair of bearings 12 which are to be mounted on a pair of uprights or supports 14. The supports 14 are advantageously cast-in bosses or the like in a housing in which the shaft 10 is to rotate. The parts 10, 12 and 14 comprise the general environment in which the invention may be used. As is clear to those skilled in the pertinent arts, this environment is extremely broad and could include many areas, tools generally such as grinders, drills, and all sorts of portable electric tools. The invention is currently being used to mount the armature shaft of a grinding machine in its housing. The invention could be used in other areas unrelated to tools such as pumps, office equipment, appliances, and the like.

The bearings 12 can be of any conventional variety, such as sleeve bearings, ball bearings, needle bearings, roller bearings, and the like. As shown best in FIGS. 2, 3 and 4, the bearing has a flat outer cylindrical surface for cooperation with the formed bearing seat 16 of the invention. Since the bearing seat is preferably rounded in planes containing the shaft axis, and since the bearing has a cylindrical outer surface, a line contact is formed therebetween. The seat need not necessarily be rounded. The essential requirement is that an essentially line contact be made between bearing and seat so that the bearing can align itself. This requirement could be met in other environment by, for example, a relatively narrow flat plateau, as on the edge of a sheet metal stamped support; or by a point-like cross-sectional shape, or by a cast-in narrow flat. Such other shapes would be used where needed dependent upon the load on the bearings, manufacturing requirements, and the like.

Figure 2:
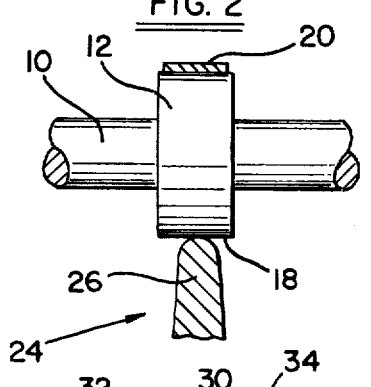
FIG. 2 is an elevational view partly in cross-section showing one of the bearings of the system of FIG. 1 in assembled condition.
Figure 3:
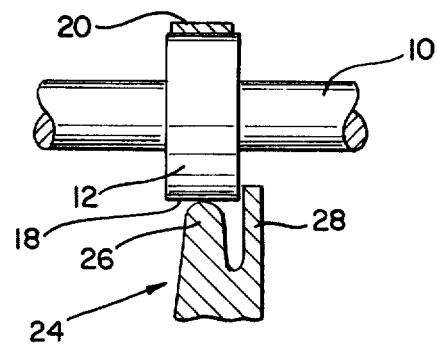
FIGS. 3 and 4 are views similar to FIG. 2 showing two modifications of the invention system.

The invention system further comprises resilient yieldable hold down means shown in FIGS. 1, 2 and 3 as the strap 20. Strap 20 is a simple steel stamping, and is so configured that it will stretch slightly in response to the assembly force applied via the screws 22 in order to snugly hold the bearing 12 against the seat 16, to thereby provide an aligned bearing, while simultaneously absorbing some of the force of the assembly operation to protect the bearing against distortion. Screws 22 pass through suitable openings in the end legs of the bearing strap 20 and are received in suitably threaded openings in the thickened portions of the supports 14. Other equivalent securing means could be used, as is well known to those skilled in the art.

Figure 4:
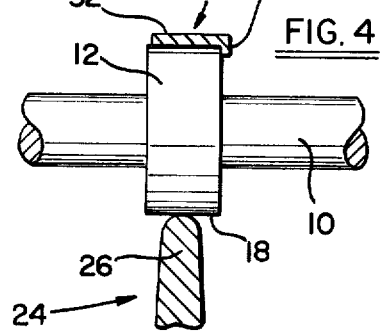

The embodiment shown in FIGS. 1 and 2 has very little resistance to axial thrust. That is, in the event of a relatively large unplanned load on the shaft 10 along its axis, or even generally along its axis, then the bearings 12 could be misaligned, or could be knocked entirely off of the bearing seats 16. FIGS. 3 and 4 show modified structure to accommodate an axial load. FIG. 3 shows the same strap 20 of FIG. 2 plus a modified bearing seat 24 which comprises a rounded portion 26, analogous to the bearing seat 16 of FIG. 2, plus an outrigger portion 28 to bear against the side of the bearing 12 in the event the bearing should be displaced in that direction. Another modification, not shown, would be to provide a central bearing seat member 26 with outriggers 28 on both sides to thereby guard against Axial thrust in both directions.

FIG. 4 shows another embodiment of means to accommodate axial thrust. This embodiment comprises the same bearing seat 16 of FIGS. 1 and 2, but a modified strap 30 which includes a main portion 32, analogous to the bulk of the strap 20, plus a radially extending flange 34 which serves the function of the outrigger 28 of FIG. 3.

Figure 5:
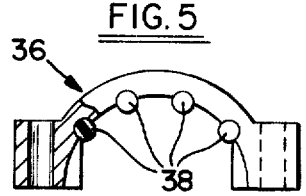
FIG. 5 is a front elevational view of a modified form of hold down member.

FIG. 5 shows a modified hold down member 36 in the form of a metal casting or machined part. Member 36 achieves the same advantages as the other forms of the invention by virtue of the plurality of inserts 38 in the form of small cylinders or balls glued or otherwise secured to the inside of the hold down member to contact the top of the bearing. Thus, the resiliency and yielding which achieves the self aligning and protects the bearing against distortion provided by the stretching of the material of the strap in the other embodiments is provided by the resiliency of the rubber or other such material from which the inserts 38 are formed. One or more inserts could be used depending upon the environment, and other kinds of resilient means could be used, such as plastic inserts, or a wavy spring metal part, or a flat inlaid band of rubber or the like, or other resilient means.

The shaft 10 shown in the drawings is highly representative of many different shafts with which the invention may be used. For example, the shaft could be tubular, or could have steps, or could have a fan or other member mounted thereon, such as a motor armature, or the like. The relatively small space provided between the outriggers and the outer bearing race is only a manufacturing convenience. There could be contact or clearance at that point, as long as shaft rotation is not disturbed.

The retainer 36 could also be integral with half of a clam shell type of housing for a tool or the like. In such case, the alignment or fastening bosses shown on the sides of the semi-circular portion could be omitted, the parts being integrally cast into a lid or other clam shell half of the housing.

It is best if the distance between the bearings is long compared to the diameter of the bearings because irregularities and differences in the bearing seats will have a greater effect on the shaft if the seats are closer together. The bearing seat need not be continuous under the bearing. For example, the invention would still operate even if the seat were notched or partly cut-away if needed to fulfill some other requirement of a particular application. Carried to an extreme, and considering the invention's use of a line contact, in the case of a very lightly loaded bearing, the seat could comprise two or more posts or uprights with their ends touching the bearing to thereby define the line of contact between the bearing and the support means.

It will of course be understood that various combinations of the various embodiments of the invention could be used. For example, either the FIG. 3 or FIG. 4 structure could be used in place of one of the supports 14 or straps 20 of FIG. 1. In a particularly demanding environment, both FIG. 3 and FIG. 4 structures could be used together. Similarly, the FIG. 5 hold down member could be used in combination with any of the other structures.

While the invention has been described in detail above, it is to be understood that this detailed description is by way of example only, and the protection granted is to be limited only within the spirit of the invention and the scope of the following claims.

We claim:

1. A system for mounting a pair of bearings which are on a common shaft, each of said bearings having an outer cylindrical surface, the combination comprising a bearing seat for each of said bearings, each of said bearing seats comprising means to form a substantially line contact with said bearing outer cylindrical surface, and resilient hold down means cooperable with said bearing seats to resiliently secure each of said bearings between its respective seat and said hold down means.

2. The combination of claim 1, each of said bearing seats being formed in a support member, and said contact means comprising a cast convex cross-sectional surface adapted to contact approximately half of said outer cylindrical surface of said bearings.

3. The combination of claim 1, and means to prevent axial thrust which might act upon said bearings from displacing said bearings out of their secured positions between said bearing seats and said hold down means.

4. The combination of claim 3, said preventing means comprising a flange portion of said resilient hold down means adapted to contact the side of at least one of said bearings inwardly of said cylindrical surface.

5. The combination of claim 3, said bearing seats being formed in a supporting member for said bearings, said preventing means comprising an outrigger portion formed on said supporting member and adapted to contact the side of at least one of said bearings inwardly of said cylindrical surface.

6. The combination of claim 1, said resilient hold down means comprising a strap for each of said bearings consisting of steel and adapted to be stretched in assembling said bearings on said seats.

7. The combination of claim 1, said resilient hold down means comprising a hold down member, and resilient means interposed between said hold down member and said bearing.

8. The combination of claim 7, said resilient means comprising a band consisting of rubber or a rubber-like material.

9. The combination of claim 7, said resilient means comprising a plurality of individual plugs consisting of rubber or a rubber-like material.

10. A system for mounting a pair of bearings on a common shaft on a pair of supporting members adapted to contact the outside of said bearings, the combination comprising a bearing seat having a convex cross-sectional bearing contact surface formed in said support members and resilient hold down means cooperable with said bearing seat and said support member to hold said bearing against said seat, whereby an essentially line contact is made between each said bearing and its bearing seat, and whereby said pair of bearings on said shaft align themselves as said hold down means are secured to said support members.

11. The combination of claim 10, said resilient hold down means comprising a strap consisting of steel and adapted to be stretched in assembling said bearing on said seat.

12. The combination of claim 10, said resilient hold down means comprising a hold down member adapted to be secured to said support member and opposite said bearing seat, and resilient means interposed between said hold down member and said bearing.

13. The combination of claim 12, said resilient means comprising a band consisting of rubber or a rubber-like material.

14. The combination of claim 12, said resilient means comprising a plurality of individual plugs consisting of rubber or a rubber-like material.

15. The combination of claim 10, said shaft comprising the armature shaft of the electric motor in a grinding machine with the armature mounted on said shaft between said bearings, and said supporting members comprising part of the housing of said grinding machine.

16. The combination of claim 10, said bearing comprising a ball bearing having an outer race having an outer cylindrical surface.

17. The combination of claim 10, and means cooperable with at least one of said bearings to prevent axial thrust on said shaft from displacing said at least one bearing off of its bearing seat.

18. The combination of claim 17, said axial thrust preventing means comprising an outrigger portion formed on said supporting member adapted to contact the side of said at least one bearing.

19. The combination of claim 17, said axial thrust preventing means comprising a flange portion of said resilient hold down means adapted to contact the side of said at least one bearing.

20. A grinding machine having a housing, an electric motor in said housing, a shaft carrying the electric motor armature, a bearing located at each end of said armature, each of said bearings having an outer cylindrical surface, integral bearing seats in said housing for said bearings, said seats each having convex cross-sectional configuration forming line contact against said outer cylindrical surfaces of said bearings, and resilient hold down means adapted to secure said bearings in said seats.

21. The combination of claim 20, said resilient hold down means comprising a strap for each of said bearings consisting of steel and adapted to be stretched in assembling said bearings on said seats.

22. A system for mounting a pair of bearings on a common shaft on a pair of support members adapted to contact the outside of said bearings, the combination comprising bearing seats each having a convex cross-sectional bearing contact surface formed in said support members, hold down means securable to said support members and cooperable with said bearing seats to hold said bearings against said seats, whereby essentially line contact is made between each said bearing and its bearing seat, and whereby said pair of bearings on said shaft align themselves as said hold down means is secured to said support members, means cooperable with at least one of said bearings to prevent axial thrust on said shaft from displacing said at least one bearing off of its bearing seat, said axial thrust preventing means comprising flange means on said hold down means adapted to contact the side of at least one said bearing.

23. A system for mounting a pair of bearings on a common shaft on a pair of support members adapted to contact the outside of said bearings, the combination comprising bearing seats each having a convex cross-sectional bearing contact surface formed in said support members, hold down means securable to said support members and cooperable with said bearing seats to hold said bearings against said seats, whereby essentially line contact is made between each said bearing and its bearing seat, and whereby said pair of bearings on said shaft align themselves as said hold down means is secured to said support members, means cooperable with at least one of said bearings to prevent axial thrust on said shaft from displacing said at least one bearing off of its bearing seat, said axial thrust preventing means comprising flange means formed on one of said hold down means and said support member associated with said at least one bearing, said flange means contacting the side of said at least one bearing.

* * * * *